United States Patent [19]
Groves

[11] 3,897,232
[45] July 29, 1975

[54] CONTROLLED FEEDING OF BATCH TO GLASS MAKING PROCESS

[75] Inventor: Archie L. Groves, Allison Park, Pa.

[73] Assignee: PPG Industries, Inc., Pittsburgh, Pa.

[22] Filed: Jan. 9, 1974

[21] Appl. No.: 432,005

[52] U.S. Cl. ............... 65/29; 65/160; 65/DIG. 13; 65/335
[51] Int. Cl. ........................................... C03b 3/00
[58] Field of Search ...... 65/160, 161, DIG. 13, 335, 65/29; 214/18 GD

[56] References Cited
UNITED STATES PATENTS
1,928,016   9/1933   Halbach et al..................... 65/160 X
3,525,090   8/1970   Raddatz........................... 65/335 X Primary Examiner—Arthur D. Kellogg
Attorney, Agent, or Firm—E. Kears Pollock

[57] ABSTRACT

An improved method for controlling the feeding of glass batch materials to a glassmaking furnace includes varying the time between successive feeding steps in order to maintain a substantially constant molten glass level in the furnace while maintaining the time between feeding steps sufficiently invariant to insure the formation of spaced furrows and ridges in the glass batch within the furnace to enhance melting of the batch materials.

10 Claims, 3 Drawing Figures

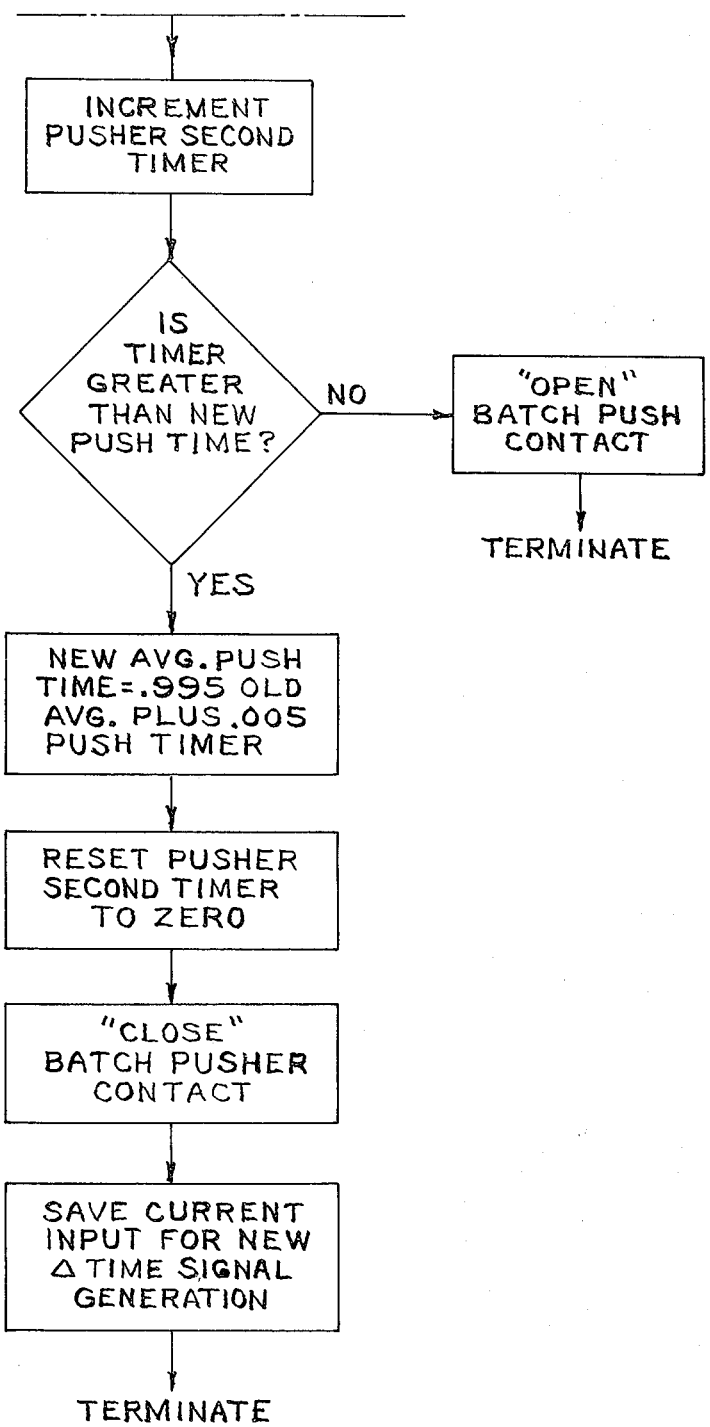

CONTROLLED FEEDING OF BATCH TO GLASS MAKING PROCESS

BACKGROUND OF THE INVENTION

Glass batch materials have long been fed to continuously operated glassmaking furnaces by continuous feeders and by intermittent or periodic feeders.

Continuous feeders are shown and described in the following U.S. Pat. Nos.: 1,623,057; 2,624,475; 2,114,545; 2,829,784; 2,773,611; 3,011,273; 3,294,506; 3,074,568; 3,204,787 and 3,436,200 as well as numerous other patents.

Intermittent or periodic feeders are shown and described in the following U.S. Pat. Nos.: 1,483,278; 2,281,050; 2,284,398; 2,284,420; 2,831,569; 2,934,225; 2,509,930; 2,804,981; 2,246,375; 3,670,908 and 2,533,826 as well as numerous other patents.

Intermittent feeders have been known to have certain disadvantages including variations in glass melt level caused both by continuous drawing despite intermittent feeding and by the intermittent sudden dumping of batch materials onto molten glass in a furnace causing waves in the molten glass.

Continuous feeders have been known to have certain disadvantages including the formation of a uniform batch blanket on top of molten glass in a furnace, which blanket thermally insulates the glass from overhead heating flames and hinders efficient melting. With a relatively flat-surfaced batch blanket suuperficial melting occurs but the molten glass cannot run off the underlying batch to present new batch to overhead flames for melting.

It has long been an objective of glassmakers to combine the benefits of both batch feeding methods while avoiding their respective drawbacks. As shown in U.S. Pat. No. 3,074,568, attempts have been made to provide furrows or the like typical of batch fed by intermittent feeders in batch blankets fed continuously to avoid level variations.

Also, attempts have been made to more closely control intermittent batch feeding by detecting the depth of molten glass in a glass-making furnace and controlling the frequency of intermittent feeding responsive to the detected depth. This has been accomplished, for example, using pusher feeding devices such as described in U.S. Pat. No. 2,281,050 in combination with a timer for setting the time between pushes with the timer connected to a molten glass level or depth-detecting device that sets the time on the timer. The time on the timer has been set using a conventional three-mode controller to receive a glass depth signal, compare it to a set point and generate a control signal which then operates a control motor to set the timer. Using such an arrangement, it has been possible to control the glass depth satisfactorily but pusher cycle times have generally varied on the order of 100 percent or more (e.g. 11 to 28 seconds between pushes for a glassmaking furnace producing about 400 tons of glass per day).

This variation in push or feed cycle times has meant that sometimes batch feedings are at such high frequency that a virtually continuous batch blanket results, and at times the batch feedings are at such low frequency that molten glass uncovered by batch is presented to the overhead heating flames near the feed end of a furnace. As a result, undesirable cycling occurs in the demand for heat in the melting region of the furnace and the melting of batch is less efficient than desired.

The present invention provides an improved method for controlling both batch feeding and molten glass level so that batch melting efficiency is maintained and a stable glass level is maintained while intermittently feeding glass batch to a glassmaking furnace.

SUMMARY OF THE INVENTION

As in conventional glassmaking processes, glass batch materials are fed onto a pool of molten glass in a glassmaking furnace. Heat is applied to the glass batch and to the molten glass by the combustion of fuel such as oil or natural gas or the like in a space called a headspace extending above the batch and molten glass in the furnace. Molten glass is withdrawn from the pool of molten glass and is cooled and attenuated to form a continuous, dimensionally stable sheet or ribbon of flat glass. The continuous sheet of glass may be formed by a "sheet" process as, for example, the Colburn process, the Fourcault process or the Pittsburgh process, or it may be formed by a "float" process as, for example, the Heal process, the Pilkington process or the like, or it may be formed by any other known process.

In the practice of this invention, the depth of the pool of molten glass in the glassmaking furnace is routinely (either continuously or intermittently) detected. This may be done by a mechanical float in combination with a strain gauge or other signal-generating device or may be done using contacting device taking advantage of the electrical conductivity of molten glass or by an optical or pneumatic proximity measuring device in combination with a servo-positioning apparatus. In a preferred embodiment a nuclear gamma ray gauge is employed. A source of radiation is provided on one side of a kiln extending from a glass-making furnace to direct radiation through the molten glass. The glass scatters the radiation so that the amount of radiation detected by a radiation-sensitive device on the opposite side of the kiln from the radiation source is proportional to the depth of the molten glass. The radiation field may be sufficiently wide to embrace all expected depth variations with the radiation path parallel to and surrounding the level of the surface of the pool of molten glass, or a narrow field may be used with the radiation path angled to intersect the surface of the pool of molten glass. A signal (electric, pneumatic or the like) is generated to represent the depth of molten glass in the furnace, and the depth detector-signal generating device is connected to a controller.

Controllers to which glass depth detectors have been connected in the past have generally been conventional three-mode controllers. In the practice of this invention, the controller may be a combination of conventional controllers combined with an analog or digital computer or may be an analog computer alone or a programmed digital computer alone. Of course, conventional signal receiving, transmitting and conditioning devices may be used in combination with any selected controller. Using whatever type of controller selected, the controller is used to generate a control signal responsive to the glass depth signal it receives. The manner of generating control signals which permit stable control of a glass-making process is described in more detail below.

Glass batch materials are fed periodically to the glassmaking furnace. This may be done using a belt feeder in combination with a gate-controlled hopper or preferably using a hopper with a pusher as described in U.S. Pat. No. 2,281,050, which is incorporated by reference herein. Other types of intermittent feeders may be used. As is conventional with intermittent feeders, a timer is provided to control the frequency of feeding. The timer may merely be the mechanical linkage of the device, such as a pusher, which intermittently or periodically feeds the batch. That is, it may be a particularly sized cam, gear, crankshaft or the like to control the frequency of pusher thrusts. More generally, the timer may be a separate device, electrical or mechanical, which is set and allowed to run down to initiate feeding cycle each time it runs down. Such a timer may be reset as soon as it runs down so that its time of run-down is the period of the feeding cycle, or it may be reset at the end of a feeding step in the cycle or any other time in the cycle that has a fixed relation to the cycle period.

The time set on such a timer is varied according to the needs of the glassmaking process. While this has been done in the past by interposing a conventional three-mode controller between a glass depth detector and the batch feeder timer, it is now done by using a controller which takes into account both the molten glass depth and the time of the current feeding cycle period. As a result, when practicing this invention, it is possible to avoid variations in molten glass depth sufficient to cause undesirably great refractory wear along the basin wall of the furnace and consequent stones in the glass. It is also possible to provide a substantially continuous blanket of batch in the feed end of the furnace which is characterized by near uniformly spaced peaks and depressions. This provides an ideal glass batch surface to receive heat for efficient melting. Consequently, the heat demanded for melting the glass batch remains substantially invariant so that fuel flows and combustion air flows may be optimized for efficient combustion rather than continually being varied to meet changing heat demands. Not only is combustion efficiency improved in this manner, but also such permitted combustion improvement substantially reduces the risk of occasional reducing conditions in the furnace which can cause streaks in metal oxide containing glasses.

The controller used in the practice of this invention receives and/or holds a signal representing the current feeding cycle time and uses this in combination with a signal representing the molten glass depth to generate a control signal to set a new feeding cycle time. The controller is operated to generate a control signal that is more dependent upon the current time signal than upon the detected glass depth signal. Preferably, the control signal is directly proportional to at least 0.95 times the currently set time and less than 0.05 times a signal generated in response to the detected depth signal and representing a feeding cycle time that would control the depth of molten glass in the furnace without regard for the condition or character of the batch blanket. In a conventional gas-fired regenerative glassmaking furnace making a soda-lime-silica glass, the respective proportionalities are preferably at least 0.99 and less than 0.01.

This invention will be further understood with reference to the drawings accompanying this disclosure.

BRIEF DESCRIPTION OF THE DRAWINGS

FIGS. 2a and 2b together form a single block diagram representation of the control steps of the present invention.

DESCRIPTION OF THE PREFERRED EMBODIMENTS

Figure 1:
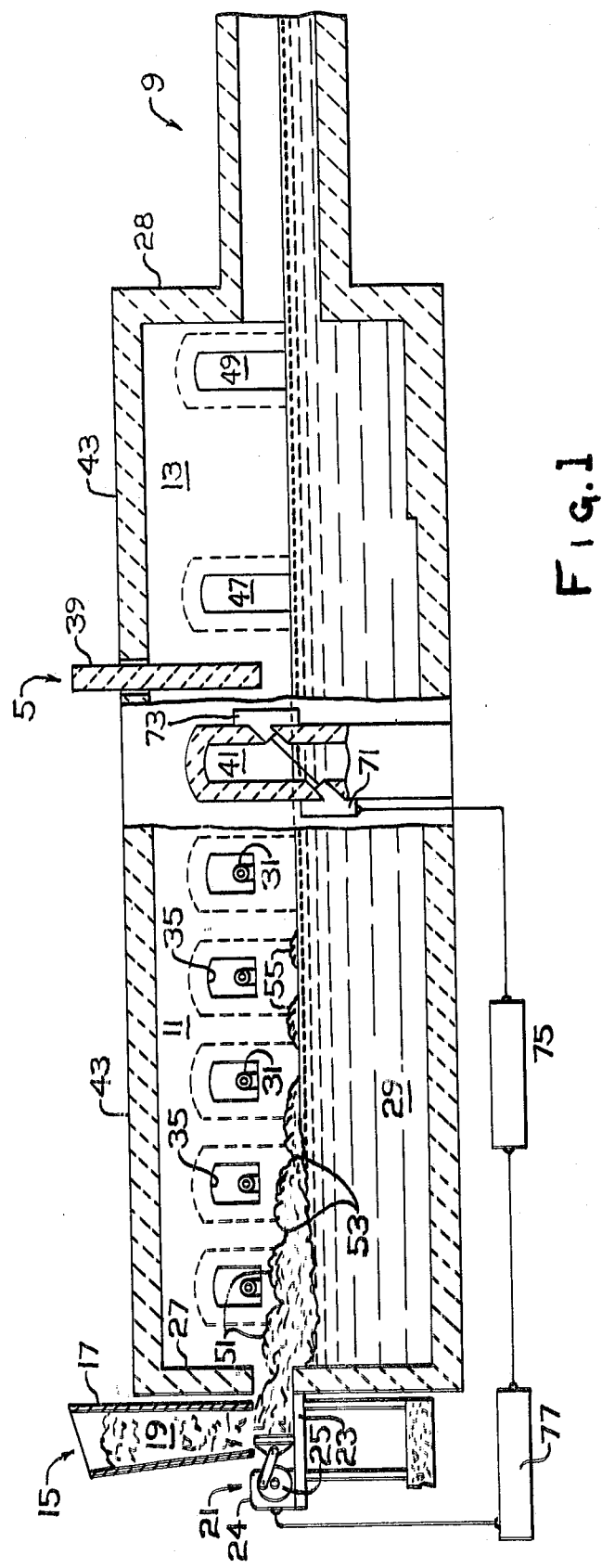
FIG. 1 is a partially cutaway, longitudinal elevation of a glassmaking furnace showing the combination of elements employed in the practice of this invention.

In FIG. 1 there is seen a glassmaking furnace 5 that is operated according to this invention. Connected to the glassmaking furnace 5 is means for withdrawing molten glass 9 from the furnace 5 and delivering it to forming means (not shown and may be any known forming means). The glass-making furnace 5 comprises a melter 11 and a refiner or conditioner 13. A batch supply means 15 is associated and in communication with the furnace 5.

The batch supply means 15 includes a hopper 17 filled with glass batch materials 19 which are supplied to the hopper after portioning of separate ingredients and mixing of them in a batching facility (not shown). The batch supply means 15 further includes a batch feeding means 21 for periodically feeding batch materials into the furnace 5.

The batch feeding means 21 includes a shelf or ledge 23 upon which batch may rest prior to being fed. The feeding means 21 includes a motor 24 and a reciprocating pusher assembly 25. The pusher 25 is driven by the motor 24 at the initiation of each feed cycle and batch materials are pushed off the ledge 23 through a back wall 27 of the furnace onto the pool of molten glass 29. The back wall 27 of the furnace may be as shown or its bottom portion may extend outwardly from its upper, suspended portion. Other walls of the furnace, such as the front wall 28, generally appear as shown.

The furnace 5 is provided with fuel supply devices or burners 31 which extend into the furnace through firing ports 35. Gas or oil may be fed through the burners 31 while combustion air is fed through the firing ports 35. This produces flames over the glass batch and molten glass to heat them and melt the batch materials.

A shadow wall 39 separates the melter 11 from the refiner 13. Generally just upstream of the shadow wall 39 in the melter 11 there are skim kilns 41 extending outwardly from the sides of the furnace. As described below, glass depth detection is preferably carried out in one of these skim kilns.

The furnace 5 further includes a conventional roof 43 extending over the glass filled portions of the furnace and providing a headspace above the batch and molten glass. One of the beneficial features of this invention is that since it permits uniformly controlled firing to be carried out that occasional excessive roof temperatures in the melter are avoided thus protecting the life of the roof 43.

In the refiner 13 are skim kilns 47 and 49 in which a glass depth detection device may be located if desired.

In the practice of this invention a substantially continuous blanket of batch is formed in the feed end of the furnace as the pusher 25 uses batch in front of it to periodically push against batch already fallen onto the molten glass 29 in the furnace. Because of the periodic pushing of batch materials, peaks 51 and depressions 53 are formed in the upper surface of the batch blanket. These are kept relatively uniformly spaced by maintaining a relatively constant push cycle time. Yet, despite occasional variations in molten glass withdrawal rate to accommodate forming requirements, the level of molten glass in the furnace is maintained substantially invariant.

As the glass batch materials receive heat from overhead flames, they begin to melt. Molten glass near the peaks 51 flows down to the depressions 53 continuously presenting new unmelted batch at the peaks 51 to the flames. As molten glass gathers in the depressions 53, some breaks through the batch while melting of that batch continues as well. Thus, the batch blanket begins to separate into logs 55 which proceed to float downstream on the molten glass until completely melted.

The depth of the molten glass in the furnace is detected by detecting the depth of molten glass in a skim kiln 41 which is in communication with the main portion of the furnace. In a preferred embodiment a radiation detector 71 is used. A source of radiation 73 is located on one side of the kiln 41. This directs a beam of gamma radiation across the kiln with the beam being at least partially interrupted by the glass surface. The beam may be horizontal and have sufficient width to cover unexpected depth changes or may be angularly disposed as shown. The radiation detector 71 is placed on the opposite side of kiln 41. It receives radiation in direct proportion to the strength of the source 73 and in inverse proportion to the amount of radiation scattering that occurs due to the depth of the glass. Thus, the detector 71 generates a signal that is proportional to the depth of the molten glass. A suitable radiation depth detector is that sold by Industrial Nucleonics of Columbus, Ohio, under the tradename ACCU-RAY gauge or a Robertshaw gamma radiation detector sold by Robertshaw Controls of Youngwood, Pa.

The glass depth detector is connected to a controller 75 which in turn is connected to a timer 77. The timer 77 is connected to the batch pusher drive motor 24 to initiate its drive cycle upon the rundown of the timer 77. A conventional electronic timer, such as an Eagle timer sold by Eagle Signal Div., E. W. Bliss Co. of Davenport, Iowa, may be used and operated or set by a motorized drive unit, such as a Beck control motor sold by H. Beck and Sons Co. of Philadelphia, Pa. In a preferred embodiment the controller 75 is a programmed digital computer, such as an IBM Model 1800 process control computer sold by IBM Corporation of Armonk, N.Y. When using such a controller, the timer 77 may be eliminated as a separate, free-standing device and a timer integral to the computer controller 75 may be used.

Figure 2A:
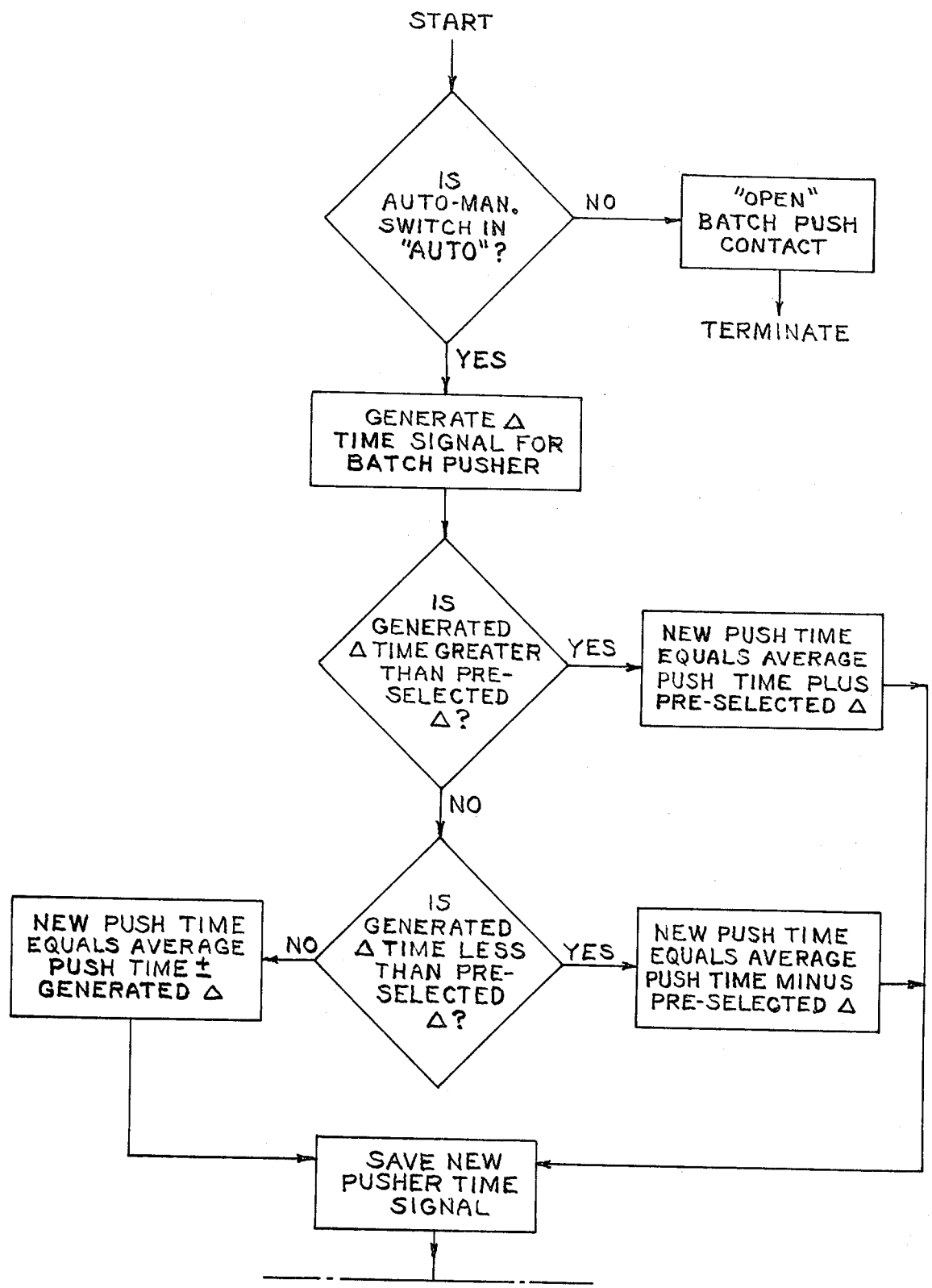

Referring now to FIG. 2 (a and b), the function and operation of the controller 75 is now described. The controller 75 includes appropriate bypass switches and circuitry to permit operation of the process in a conventional manner while bypassing the controller 75. At the outset of a control cycle the controller tests the condition of such a switch; if it is set for manual or conventional control the control terminates with the opening of a switch or contact for transmitting the control signal to the batch feeder; if it is set for automatic control, "Auto", the step of generating a control signal begins.

Generation of a control signal involves several steps, the first of which is to generate a delta ($\Delta$) or incremental time signal. The delta time signal is generated responsive to the detected glass depth signal. The delta time signal is generated according to the relation $$\Delta \text{ Time} = K\ [Kg\ (d - D) + Kr\ (d - d_1)\ ]$$

where

K is a proportionality constant relating depth in units of distance (e.g. inches or thousandths of inches) to push time in units of time (e.g. seconds)

Kg is controller gain, d is the currently detected depth,

D is a depth set point,

Kr is controller rate, and $d_1$ is the detected depth at the time of the last push or feed cycle The generated delta time signal is compared in the controller to a preselected or set point delta time. If the generated delta time signal is greater than the preselected delta time, a new push time signal is generated that is equal to the prior existing average push time plus the preselected delta push time. This prevents excessive variations in feed cycle times with consequent variations in heat demand.

If the generated delta time signal is not greater than the preselected delta time signal, it is tested for equality thereto, preferably by testing for being less than the preselected delta time signal. If it is not less than the preselected delta time signal, a new push time signal is generated that is equal to the prior existing average push time plus or minus the generated delta time signal depending upon its sign. If the generated delta time signal is less than the preselected delta time signal, a new push time signal is generated that equals the prior existing average push time signal minus the preselected delta time signal. However generated, the new push time signal is held and used to test an incremented push timer.

The timer is incremented, that is, it is readied for resetting. The push time signal representing the time to be set without further control is tested against the new push time signal. If it is not greater than the new push time signal, control by the new signal is terminated by opening contact on the batch pusher drive. If the timer signal is greater than the new push timer signal, a new control signal is generated.

The new control signal representing a new time to be set on the timer is generated to equal 0.995 times the old average push time signal (or preferably an average old push time signal combining several prior signals) plus 0.005 times the newly generated push time signal. The pusher timer is then set to zero to run out according to the generated control signal. The pusher contact is closed to initiate pushing of batch. The control signal is held or saved for generation of a new control signal on the next control cycle, and the control cycle terminates.

Using this series of level detection, control signal generation and batch pushing control the frequency of batch pushing is maintained within plus or minus four seconds per cycle while the level of molten glass in the furnace is maintained within plus or minus twenty thousandths of an inch on a glassmaking furnace producing about 400 tons of soda-lime-silica glass per day in the form of a continuous sheet using a conventional float forming process. The glass is of excellent quality. During the operation of the process the roof or crown temperature above the unmelted batch is maintained substantially unchanged from one firing cycle to another as the demand for heat is maintained from cycle to cycle.

This invention may be practiced in the making of any conventional glass, such as, for example, soda-lime-silica glass, borosilicate glass, alumino-silica glass or the like. It is applicable to regenerative or recuperative glassmaking furnaces and the like. It is applicable to the making of flat glass, fiber glass or other glass products. As will be recognized by those skilled in the art, variations may be made in the practice of this invention without departing from its spirit. Accordingly, this disclosure is intended to be illustrative, rather than limiting.

I claim:

1. In a method of manufacturing glass wherein glass batch materials are periodically fed onto a pool of molten glass contained in a glassmaking furnace, heat is applied to the glass batch materials to form molten glass therefrom by the combustion of fuel in a space within the glassmaking furnace extending above the glass batch materials and the pool of molten glass and molten glass is continuously withdrawn from the glassmaking furnace and cooled and formed into a glass product; the combination of steps of a. detecting the depth of the pool of molten glass and generating a signal representative of the detected depth of molten glass;
  b. maintaining a signal representative of the currently existing time between successive steps of periodically feeding glass batch materials onto the pool of molten glass;
  c. generating a signal representative of a time between successive steps of periodically feeding glass batch materials onto the pool of molten glass responsive to the signal representative of the detected depth of molten glass, such generated signal representing a time sufficient to maintain the depth of the pool of molten glass substantially invariant;
  d. generating a control signal responsive to both the maintained signal representative of the existing time between successive steps of periodically feeding glass batch materials onto the pool of molten glass and the generated signal representative of a time between successive steps of periodically feeding glass batch materials onto the pool of molten glass; and
  e. feeding glass batch materials by pushing successive substantially equal amounts of glass batch material onto the pool of molten glass wherein the feeding is periodic with intermittent periods without feeding between pushes the periodic feeding having a frequency and the frequency of the periodic feeding is controlled responsive to the control signal to maintain the depth of the pool of molten glass substantially invariant while causing the glass batch materials that have been fed to form a blanket of batch material on the surface of the pool of molten glass, the blanket having substantially uniformly spaced peaks and depressions by maintaining the period between pushes within one percent of the previous period between pushes.

2. The method according to claim 1 wherein the step of controlling the frequency of feeding glass batch materials is accomplished by setting a timer to rundown and upon rundown to initiate a feeding cycle and the control signal generated represents a time for setting such timer.

3. The method according to claim 2 wherein the step of setting the timer is accomplished at a fixed time from the initiation of feeding glass batch.

4. The method according to claim 3 wherein the step of setting the timer is accomplished substantially immediately following the initiation of feeding glass batch.

5. The method according to claim 1 wherein the control signal generated is generated directly proportional to the currently existing time signal and directly proportional to the generated signal representative of a time between successive steps of periodically feeding glass batch materials onto the pool of molten glass.

6. The method according to claim 5 wherein the control signal is generated with greater proportionality to the currently existing time signal than to the generated signal representative of a time between successive steps of periodically feeding glass batch materials onto the pool of molten glass.

7. The method according to claim 6 wherein the control signal is directly proportional to at least 0.99 times the currently existing time signal and to less than 0.01 times the generated signal representative of a time between successive steps of periodically feeding glass batch materials onto the pool of molten glass.

8. The method according to claim 5 wherein in the step of generating a control signal the control signal is generated directly proportional to a series of past currently existing time signals representative of an average currently existing time between successive steps of periodically feeding glass batch materials onto the pool of molten glass.

9. The method according to claim 1 wherein in step (c) the signal is generated proportional to a deviation in molten glass depth from a preselected controlled depth and proportional to a rate of change of the deviation in molten glass depth from one feeding cycle to another.

10. The method according to claim 1 wherein in the step of controlling the frequency of periodically feeding glass batch materials onto the pool of molten glass the time between successive steps of periodically feeding glass batch materials is maintained sufficiently short to maintain a substantially continuous blanket of batch on the pool of molten glass in the vicinity of the feed end of the furnace with the blanket of batch having substantially uniformly spaced peaks and depressions in its upper surface.

* * * * *